United States Patent [19]

Mrugala et al.

[11] 4,238,026
[45] Dec. 9, 1980

[54] ACCUMULATING CONVEYOR SYSTEM

[75] Inventors: Ronald J. Mrugala, Brooklyn Park; Keith W. Nord; Ronald B. Benson, both of Stillwater, all of Minn.

[73] Assignee: Ex-Cell-O Corporation, Troy, Mich.

[21] Appl. No.: 80,897

[22] Filed: Oct. 1, 1979

[51] Int. Cl.$^3$ .............................................. B65G 47/26
[52] U.S. Cl. ...................................... 198/460; 198/751
[58] Field of Search ................ 198/751, 460, 459, 488, 198/718, 955, 774, 776, 425

[56] References Cited

U.S. PATENT DOCUMENTS 3,565,241   2/1971   Race ........................................ 198/425

FOREIGN PATENT DOCUMENTS 624836   9/1978   U.S.S.R. ..................................... 198/774

Primary Examiner—Robert B. Reeves
Assistant Examiner—Douglas D. Watts
Attorney, Agent, or Firm—John P. Moran

[57] ABSTRACT

The specification discloses an accumulating conveyor system (10) including fixed support rails (24), a pair of chains (18), each having half tall links (70) and half short links (72), mounted around upper and lower movable guides (68) and (66) respectively. Air bags (52) serve to raise the guides and chains to lift stacks or cases off the rails, and a cylinder (96) serves to index the raised guides and chains forward, whereupon the air bags are deflated to set the stacks back onto the rails, and the cylinder retracts. When a stack is thus "walked" to the end of the tall links, a switch (104) causes the chains to retract the length of a stack plus a clearance gap relative to the guides (68) to accommodate the accumulation of the next stack and bringing short links beneath the accumulated stacks. When it is desired to discharge the accumulated stacks, a dual level plate member (88), which is slidable relative to the guides, allows the air bags to raise the guides one level higher, thereby causing the short links to lift the accumulated stacks and carry them to discharge when the cylinder indexes. Accumulation and discharge may occur simultaneously.

6 Claims, 7 Drawing Figures

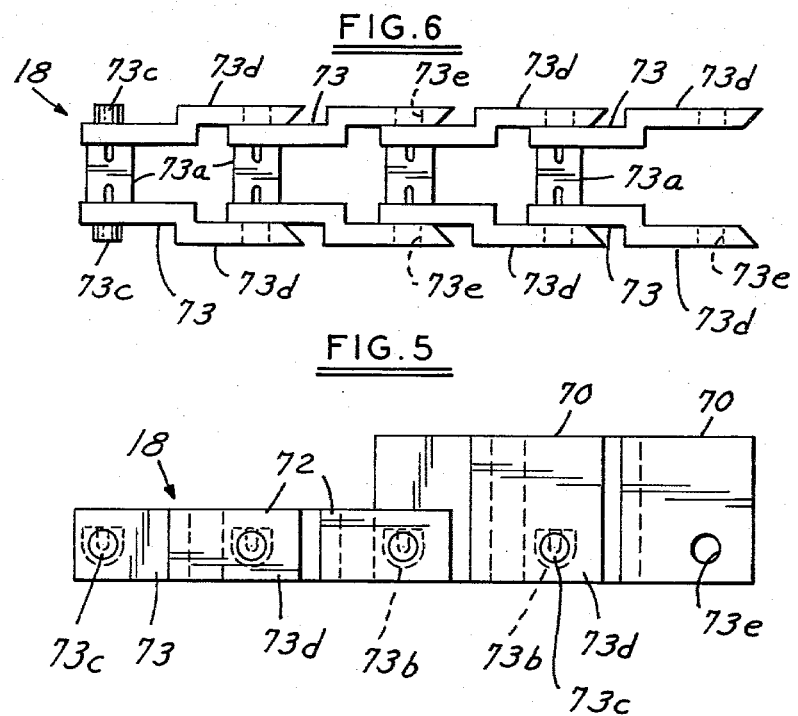

ACCUMULATING CONVEYOR SYSTEM

TECHNICAL FIELD

This invention relates generally to accumulating conveyors and, more particularly, to such conveyors wherein stacks or cases, or the like, carrying a variety of products, are accumulated one behind the other with no build-up of back pressure thereon.

BACKGROUND ART

Heretofore, a variety of types of accumulating conveyor systems have been used, some of which employ a series of carrier rollers, for example, U.S. Pat. Nos. 3,650,376; 4,133,425; and 4,148,391, while others utilize parallel rows of roller chains which support and transport cartons or other types of loads, for example, U.S. Pat. Nos. 3,056,483; and 3,690,439. Still other systems incorporate "walking beam" type arrangements wherein articles are moved intermittently in stepwise fashion from a first station to a second station with provisions for varying the spacing between articles for precise positioning thereof, for example, U.S. Pat. No. 3,970,008, or with provisions for accumulating the articles for individual or group transfer, for example, U.S. Pat. No. 3,565,241.

DISCLOSURE OF THE INVENTION

It is a general object of this invention to provide an improved accumulating conveyor system.

Another object of the invention is to provide an improved accumulating conveyor wherein stacks or cases are accumulated without any build-up of back pressure.

Still another object of the invention is to provide a walking beam or indexing type of accumulating conveyor system wherein spaced parallel rows of beams consist of parallel chains which are indexed forward as a unit with their respective support channels until a particular stack or case being conveyed reaches its accumulated position, whereupon means are provided for moving the chain rearwardly a stack or case length prior to the next accumulating cycle.

A further object of the invention is to provide an accumulating conveyor system for stacks or cases, or the like, and including a central movable section, means for indexing such section, an endless chain mounted around the central movable section for movement therewith while conveying the stacks or cases. The chain has one half of its length formed of tall links and the other half of its length formed of short links, with the stacks which are being conveyed riding on tall links, while the short links are adapted to pass beneath all accumulated stacks until such time as it is desired to discharge the stacks or cases whereupon the short links are raised by suitable means into contact with the stacks for conveying same to a discharge station.

A still further object of the invention is to provide an accumulating conveyor system including stationary parallel rails for supporting stacks or cases or the like, parallel endless chains, each formed in part by tall links and in part by short links and mounted in support channels intermediate the parallel rails, pneumatic means for at times raising the support channels a distance sufficient to position the plane of the top surface of the tall links above the plane of the parallel rails to thereby lift the stacks or cases off of the parallel rails, indexing means for moving the support channels and the associated endless chains forward as a unit in increments equal to the length of one stack or case while the pneumatic means is raised, the latter being adapted to lower the support channels at the end of each increment to thereby reset the stacks or cases onto the parallel rails. The stacks or cases are thus moved forward in stepwise fashion from an infeed station to a discharge station. Switch means mounted at the juncture of the tall and short links is actuated by the arrival of a stack or case, causing a motor to urge the endless chains rearwardly, progressively sliding along the support channels the length of one unit for each newly arrived unit during the accumulating cycle, thereby positioning short links beneath each newly arrived stack or case. When it is desired to discharge the accumulated units, bars having two reference surfaces cooperate with the support channels to position them at a different elevation such that the plane of the top surface of the short links is now above the plane of the parallel rails, thus serving to lift the stacks or cases off of the rails to be discharged by the action of the indexing means.

These and other objects and advantages of the invention will be apparent when reference is made to the following description and accompanying drawings.

BRIEF DESCRIPTION OF DRAWINGS

FIG. 5 is an enlarged side elevational view of a portion of the chain embodied in the invention;

FIG. 6 is a top view of the chain portion shown in FIG. 5; and

BEST MODE OF CARRYING OUT THE INVENTION

Figure 1:
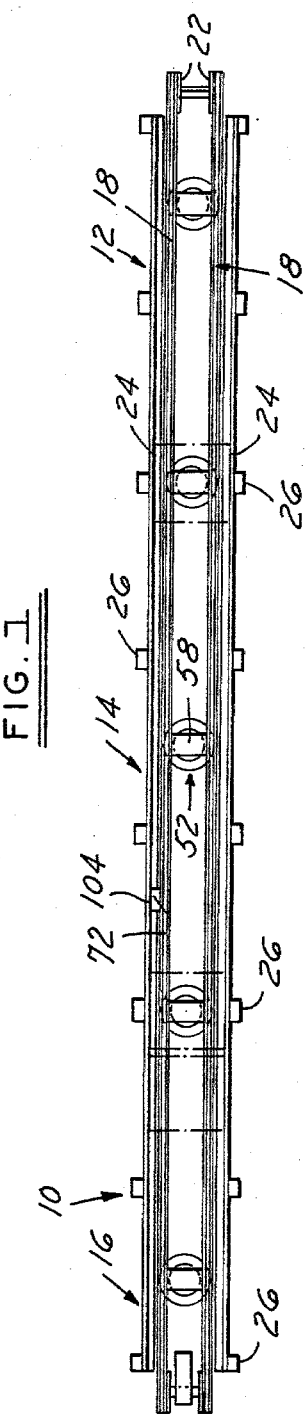
FIG. 1 is a plan view of an accumulating conveyor system embodying the invention.
Figure 2:
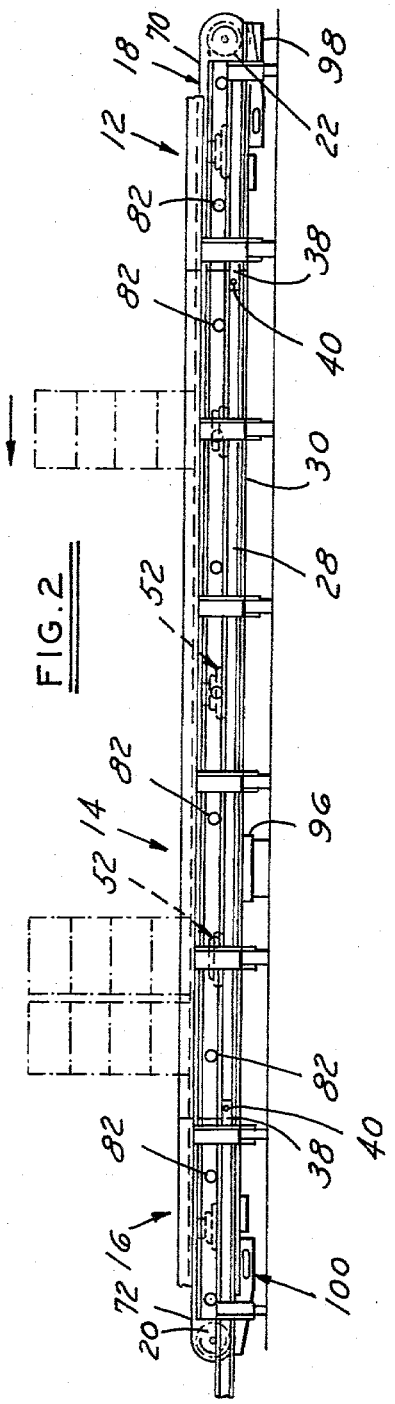
FIG. 2 is a side elevational view of the FIG. 1 system.

Referring now to the drawings in greater detail, FIG. 1 illustrates an accumulator conveyor system 10 including an infeed section 12, an accumulator section 14, and a discharge section 16. Each of the infeed and discharge sections is a predetermined constant length, say, approximately 2 feet, whereas the accumulator section may be any practical length, say, from 10 feet to several hundred feet, preferably in 10 feet sections. Parallel endless chains 18 are mounted around pairs of driving and driven sprockets 20 and 22 positioned adjacent the respective discharge and driven ends of the system 10.

Figure 3:
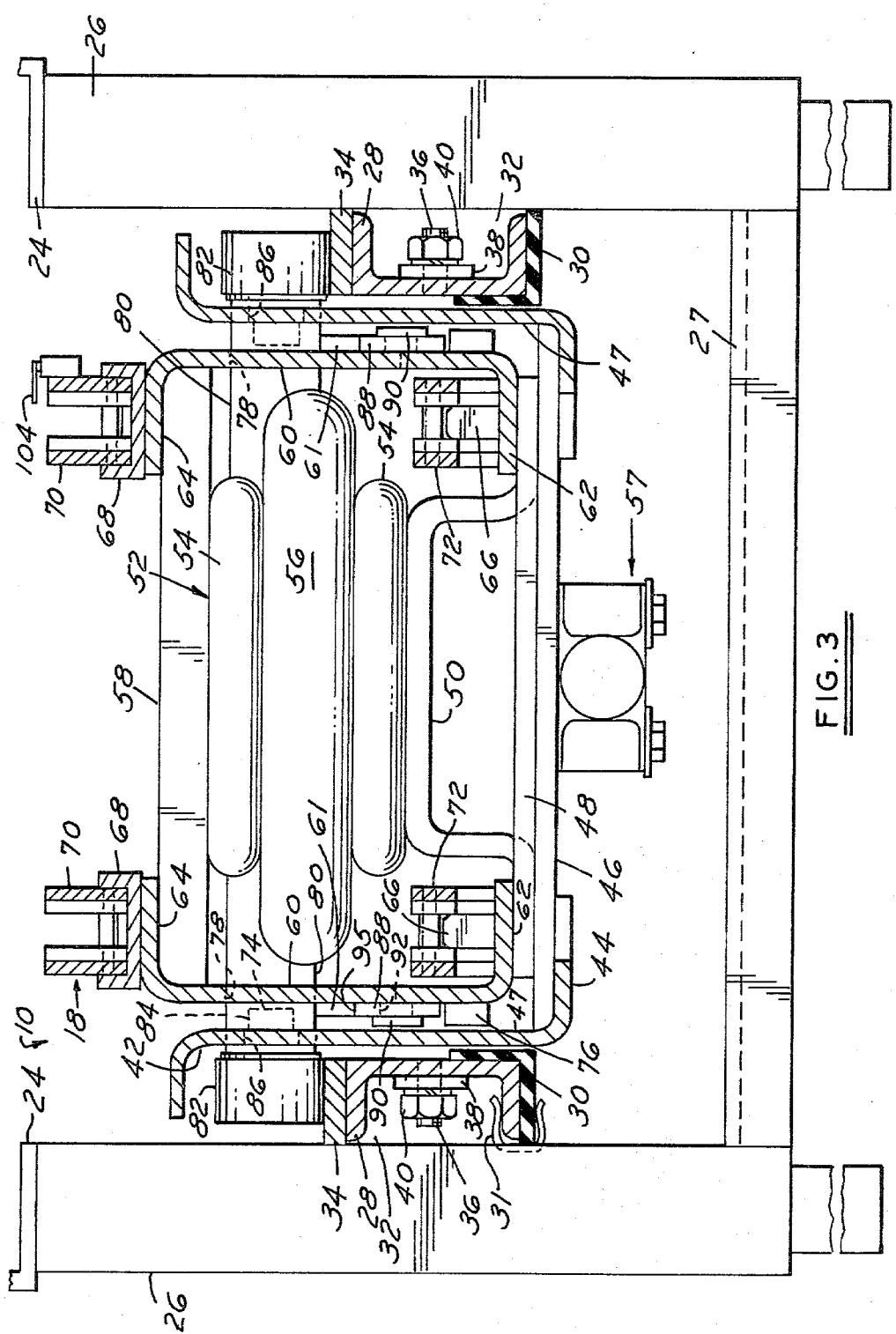
FIG. 3 is a cross-sectional view taken along the plane of the line 3—3 of FIG. 1, and looking in the direction of the arrows.
Figure 4:
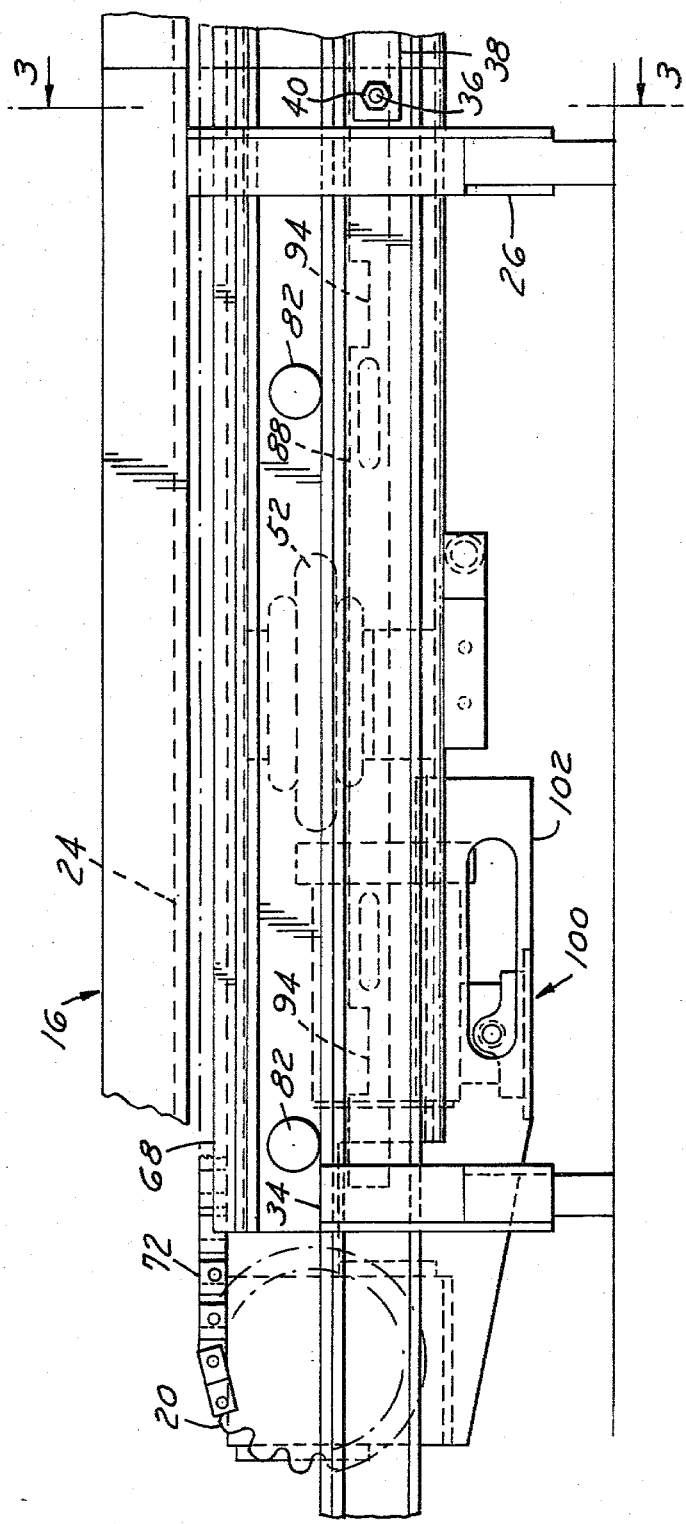
FIG. 4 is an enlarged fragmentary view of the discharge section of the FIG. 2 structure.

Each section 12, 14 and 16 includes stack support rails 24 spaced a predetermined distance apart and supported on parallel rows of longitudinally spaced support posts 26 secured to a frame 27 (FIG. 3). A pair of open-sided roller tracks 28 are secured in any suitable manner, such as by welding, to the posts 26. A pair of plastic L-shaped lower guide members 30, are secured by U-shaped clips 31 to the respective tracks 28. As better seen in FIG. 3, the open side 32 of each roller track 28 faces outwardly, i.e., toward the adjacent posts 26. A suitable wear strip 34 is secured along the upper surface of each roller track 28. A threaded stud 36 is secured adjacent each end of each roller track 28 of each section 12, 14 and 16, extending toward the open side 32. A connector pad 38 is mounted on adjacent section studs 36 and secured thereon by a nut 40, serving to interconnect adjacent sections.

A slide member 42 having a bottom inwardly extending flange 44 extends along opposite sides of each section 12, 14 and 16. A plurality of spreader bars 46 are mounted at spaced intervals on the flanges 44 between the vertical side walls 47 of the slide members 42. A stiffener bar 48 rests on every other spreader bar 46, while an inverted U-shaped mounting bar 50 rests on each intermediate spreader bar 46. A suitable air bag 52 having metal end covers 54 and a central extendable, rubber portion 56 is mounted on the upper surface of each mounting bar 50. Suitable valve means 57 is operatively connected to the air bag 52 for at times expanding the rubber portion 56. An upper mounting bar 58 is secured to the top cover 54 of each air bag 52.

Inner channel members 60, interconnected by brackets 61, are mounted adjacent the inner surfaces of the respective slide mechanisms 42. Each includes inwardly extending lower and upper flanges 62 and 64, respectively, with the stiffener bars 48 being secured to the bottom surfaces of the respective lower flanges 62, retaining the spread of the slide members 42 and lifting off of the spreader bars 46 when the air bag 52 is inflated. The upper mounting bars 58 are secured to the bottom surfaces of the upper flanges 64, and the top covers 54 are, in turn, secured to the bars 58. A lower chain guide strip 66 is secured along the length of the upper surface of each lower flange 62. A U-shaped guide channel 68 is secured along the length of the upper surface of each upper flange 64.

An individual endless chain 18, having half its length formed of tall links 70 (FIG. 5), and the other half of its length formed of short links 72 (FIG. 5), is mounted in each guide channel 68 and on the respective lower chain guide strip 66, with the junctures of the links 70 and 72 of the parallel chains 18 being aligned laterally. The links may be formed of any suitable plastic material. Each link 70 and/or 72 includes a pair of spaced wall members 73 interconnected by a rigid cross bar 73a. A rounded surface 73b is formed on the bottom side of the cross bar for cooperation with the teeth of the sprockets 20 and 22. A pair of axially aligned round projections 73c extend outwardly from the respective wall members 73. A pair of tall (70) or short (72) leg members 73d extend from one end of the respective wall members in a stepped relationship therewith such that the distance between the inside surfaces of the leg members is at least as great as the distance between the outside surfaces of the wall members 73. A pair of axially aligned holes 73e are formed in the respective leg members 73d. With this arrangement, the leg members of one link become spread, upon the forcing of the wall members and associated projections of another link therebetween, until the projections snap into the axially aligned holes of such other link to form the chain 18. In view of the type of material used, the chain 18 has the additional advantage that it need not be lubricated as would be the case with a conventional metal chain.

Upper and lower spacers 74 and 76 are secured at spaced intervals along the inner surface of each side wall 47 and along the outer surface of each inner channel member 60, respectively. A plurality of spaced vertical slots 78 (FIG. 3) are formed in each inner channel member 60 for the extension therethrough of respective round roller mounting bars 80. A plurality of rollers 82, each having a threaded extension 84 formed on one side thereof, are mounted for rolling movement on each wear strip 34. Each threaded extension 84 extends through a hole 86 formed in the slide mechanism 42 and is threadedly connected to the adjacent end of respective round bars 80 to thereby support the entire central movable mechanism comprising the slide members 42, the inner channel members 60, the chains 18, and all associated components.

A dual level plate 88 is slidably retained along the outside surface of each inner channel member 60 by mounting bolts 90 extended through respective spaced horizontal slots 92 into the member 60. Spaced cutout portions 94 of equal predetermined lengths are formed below the upper surface 95 of each plate 88 to provide a second level for cooperation with respective roller mounting bars 80 for a purpose to be described.

Figure 7:
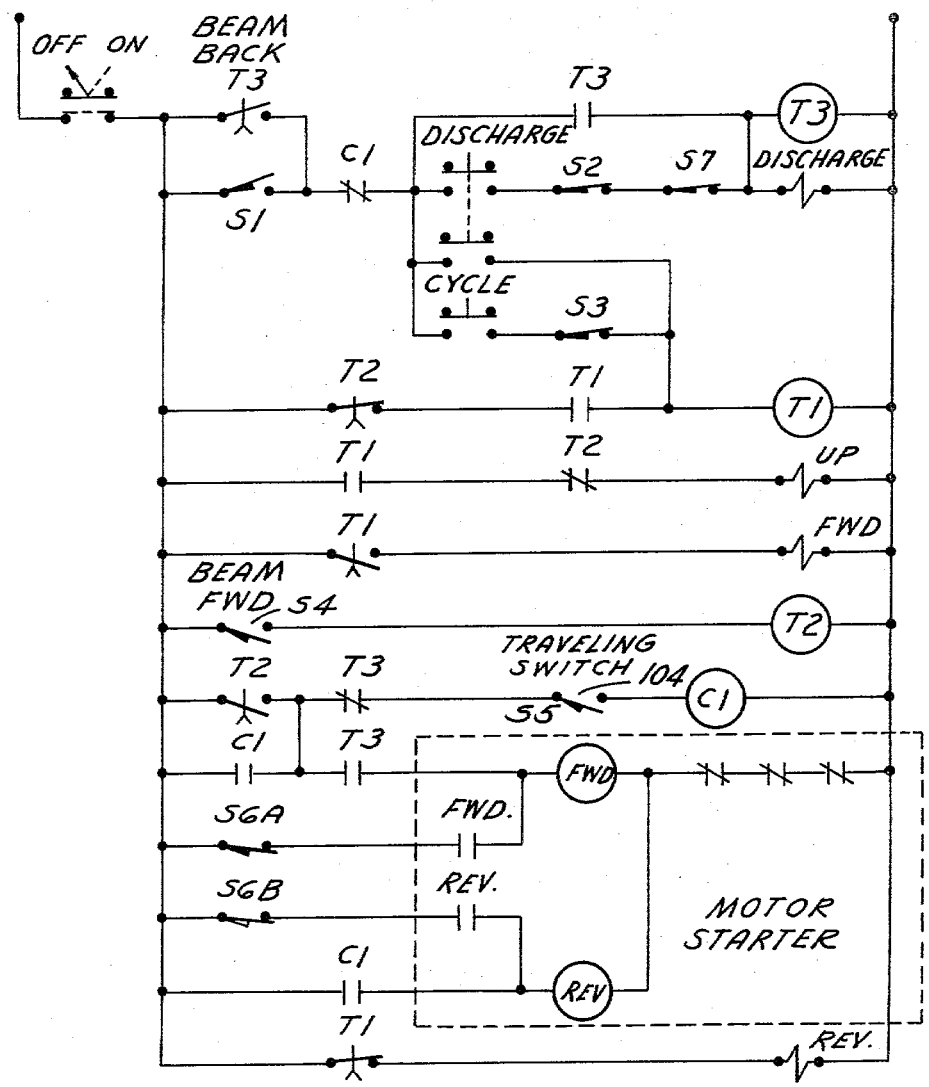
FIG. 7 is a wiring diagram which may be used in conjunction with the invention.

A suitable cylinder 96, which may be either a hydraulic or an air unit, is mounted within the inner channel members 60, intermediate any two of the air bags 52, and operatively connected to any suitable cross member between the oppositely disposed slide members 42, for urging the latter, and all the elements connected thereto, such as the inner channel members 60 and the roller mounting bars 80, a distance equal to the length of one stack, plus a small clearance gap of one to two inches, as will be explained. A smaller hydraulic or air cylinder 98 is mounted in any convenient location, preferably in the infeed section 12, and is operatively connected at one end thereof to a tie bar (not shown) mounted between the dual level plates 88 and secured at the other end thereof to one of the channel members 60. The cylinder 98 thus serves to slide the plates 88 a distance sufficient to bring the horizontal slots 92 into vertical alignment with the bars 80. A drive motor 100 with suitable gear reduction means is mounted on a base plate 102 in the discharge section 16 and is operatively connected to the chain 18 for moving the latter forwardly or rearwardly relative to the guide channel 68 and the guide strip 66. A switch 104 is mounted at the juncture of the tall and short chain links 70 and 72 respectively, unless an electronic equivalent thereof is programmed into the system, for cooperation with accumulated stacks in a manner to be described. Additional electrical components, such as switches, time delays, and control relays, as required, are included in any suitable arrangement such as that shown in FIG. 7, such arrangement not being a part of this invention.

OPERATION

When the accumulator conveyor system 10 is empty, the tall link 70 half of the chain 18 will extend along the full length of the guide channel 68, while the short link 72 half of the chain rides on the lower guide 66. Now, when a first stack of trays or cases are fed by a suitable conveyor (not shown) onto the infeed section 12, it will rest upon the support rails 24. Once the system 10 is turned on, the valve means 57 may be actuated as desired to cause the flexible portion 56 of each air bag 52 to raise. This will urge the upper mounting bars 58, the inner channel members 60, the guide channels 68, and the links 70 of the chains 18 upwardly a distance sufficient to raise the stack off the support rails 24.

The large cylinder 96 will then index the members 58, 60, 80, 68 and 70 as a unit in increments equal to one stack length plus the predetermined clearance gap, thus moving the stack or stacks one increment forward. The air bags 52 are then deflated, causing the indexed unit to lower, setting the stacks once again on the support rails 24, and the cylinder 96 retracts, returning the unit to its original position. The cylinder 96 will continue to index until the leading stack reaches the end of the accumulator section 14, at which point such stack will contact the switch 104. During this operating cycle, the rollers 82 on the ends of the mounting bars 80 will roll forward and then back on the wear strips 34, the bars 80 being retained by the slide members 42 at their original elevations while the inner channel members 60 move vertically relative thereto by virtue of the vertical slots 78 through which the bars 80 are mounted.

Actuation of the switch 104 mounted at the juncture of the tall and short links 70 and 72 causes the drive motor 100 to rotate the chain 18 rearwardly one stack increment relative to the guide channels 68 and forwardly relative to the lower guides 66, with the result that the switch is now positioned one increment behind the rear wall of the leading stack. Now, it's apparent that only short links 72 will be positioned beneath the just deposited leading stack.

Once the second stack is indexed forward to the point where it contacts the switch 104, the latter will once again actuate the drive motor 100 to cause the chain 18 to retreat one more stack length, ready to detect the arrival of the next stack. The process is repeated for additional stacks. Thus, it's apparent that each new stack is deposited just behind the preceeding stack with any predetermined gap therebetween, and that no back pressure is experienced by any of the stacks as they are accumulated along the length of the accumulator section 14. It should also be apparent that back-to-back stacks could be indexed and accumulated as a unit, with the switch 104 retracting to one increment behind the rear end of the last accumulated stack before shutting off the motor 100.

All the while that the above described accumulating cycle is taking place, each bar 80 is positioned a predetermined distance, say one-half inch, above the top surfaces 95 of the sliding plates 88, permitting a half inch upward movement of the air bags 52 and, hence of the links 70. When it is desired to discharge the stacks, the small cylinder 98 is actuated, moving the plate 88 forward a distance equal to the length of a cutout portion 94. Now, instead of each roller mounting bar 80 being positioned above the top surface 95, it will be located directly above a respective cutout portion 94. Thus, when the air bags 52 are inflated, they will extend upwardly farther, until the bottoms of respective cutout portions 94 contact the roller mounting bars 80, serving to now raise the short links 72 above the plane of the support rails 24. When this happens, the accumulated stacks are raised off the rails 24 by the short links, and carried forward by the cylinder 96 into the discharge section 16. Additional switch means may be employed to cause the drive motor 100 to now move the chains 18 forwardly one increment relative to the guide channels 68. Thus, the juncture of tall and short links of the chain 18 remains one increment behind the last stack after each indexed movement. Accordingly, once the last stack is discharged, the chains 18 are ready for a new cycle, i.e., with the tall link 70 half of each chain 18 extended along the full length of the guide channel 68.

INDUSTRIAL APPLICABILITY

It should be apparent that the invention provides a simplified, efficient and compact arrangement for accumulating stacks or cases carrying virtually any product without back pressure being applied thereto, while maintaining the bottoms thereof free of any frictional damage.

It should also be apparent that stacks or cases can be discharged and accumulated at the same time. In other words, while the short links 72 are serving to discharge one or more stacks, the tall links 70 trailing behind will continue to perform their accumulating function by indexing any incoming stacks or cases in the manner described above but at a one-half inch higher level.

While but one embodiment of the invention has been shown and described, other modifications thereof are possible.

What is claimed is:
1. An accumulating conveyor system comprising:
 (a) stationary parallel rails extending from an infeed station to a discharge station for supporting stacks or cases or the like,
 (b) channel means movably mounted intermediate said parallel rails,
 (c) parallel endless chains, each formed in part by tall links and in part by short links, mounted around said channel means for movement therewith, with said tall links being initially positioned along the length of the upper surface of said channel means,
 (d) pneumatic means for at times raising said channel means a distance sufficient to position the plane of the top surface of said tall links above the plane of said parallel rails to thereby lift said stacks or cases off of said parallel rails,
 (e) indexing means operatively connected to said channel means for moving said channel means and associated endless chains forward as a unit a distance equal to the length of one stack or case while said pneumatic means is raised, and retracting said channel means and chains once said pneumatic means is lowered, said pneumatic means being adapted to lower said channel means at the end of each forward stroke to thereby reset said stacks or cases onto said parallel rails, said stacks or cases thus being moved forward in stepwise fashion from said infeed station to said discharge station,
 (f) electrical switching means operatively connected to said tall and short links and adapted to sense the arrival of a stack or case adjacent the juncture of the tall and short links,
 (g) motor means adapted to respond to the actuation of said electrical switching means to slide said endless chains rearwardly relative to said channel means the length of one stack or case, such that said short links become positioned beneath said newly arrived stack or case to permit accumulation of said stacks or cases, and
 (h) plate means operatively connected to said channel means and adapted to position said channel means at a different elevation such that the plane of the top surface of said short links is above the plane of said parallel rails when said pneumatic means is raised to thereby lift said stacks or cases off of said rails to be discharged by the action of said indexing means.

2. The accumulating conveyor system described in claim 1, wherein said pneumatic means includes a plurality of air bags mounted at spaced intervals along the center thereof, mounting bars interconnecting the tops of said air bags to said channel means and valve means operatively connected to said channel means for extending said air bags and thereby raising said channel means.

3. The accumulating conveyor system described in claim 1, wherein said indexing means includes a cylinder mounted along the center of said channel member and adapted to move said channel member forward and backward a distance equal to the length of one stack or case.

4. The accumulating conveyor system described in claim 1, wherein said channel means includes a pair of parallel slide members movably mounted between said rails and having a plurality of aligned openings formed therein, a pair of inner channel members mounted between said slide members and having a plurality of aligned vertical slots formed therein and parallel chain guide channels formed along the top surface thereof, a plurality of mounting bars extended through respective aligned openings and aligned vertical slots such that said slide members and said inner channel members move longitudinally together while said inner channel members may be moved vertically relative to said slide members, and pneumatic means for at times raising said inner channel means.

5. The accumulating conveyor system described in claim 1, wherein said electrical means includes a switch mounted at the juncture of said tall and short links.

6. The accumulating conveyor system described in claim 4, wherein said plate means includes a plate member slidably mounted along the outside surface of each of said inner channel members and having a plurality of spaced cut-out portions are moved out of vertical alignment with said mounting bars to thereby change the operational level of said inner channel members and allow said stacks or cases to be lifted off of said rails by said short links.

* * * * *